UNITED STATES PATENT OFFICE.

HERMAN WILLEM KNOTTENBELT, OF BRUSSELS, BELGIUM.

PROCESS OF TREATING PETROLEUM AND SHALE OILS.

1,194,033.  Specification of Letters Patent.  Patented Aug. 8, 1916.

No Drawing.  Application filed January 13, 1910. Serial No. 537,858.

*To all whom it may concern:*

Be it known that I, HERMAN WILLEM KNOTTENBELT, a subject of the Queen of the Netherlands, and resident of 55 Rue Defacqz, Brussels, Belgium, have invented certain new and useful Improvements in Processes of Treating Petroleum and Shale Oils, of which the following is a specification.

This invention relates to improvements in treating petroleum and shale oils and their distillates.

According to this invention various oils can be employed such as Boryslav petroleum and others which owing to certain peculiarities cannot be treated profitably, by the ordinary methods. In treating Boryslav petroleum by the ordinary method only a comparatively small percentage of illuminating oil, suitable for use in lamps, can be obtained, while according to my process a much larger percentage of illuminating oil of a superior character can be obtained, together with light distillates which, after deodorization as hereinafter described, can be used as substitutes for turpentine in mixing paints, and also a distillate that can be used in plumbers' torches.

The oil to be treated is first submitted to fractional distillation and the first fraction having the specific gravity of about 0.757 can be used in torches, the second fraction having a specific gravity of about 0.776 to 0.778 after suitable treatment can be used as a substitute for turpentine, and the higher boiling fraction which has a specific gravity of about 0.8255 and an Abel flash point of about 65° C. after suitable treatment, can be used as a lamp oil. The specific gravities as well as the flash points will vary more or less with the different varieties of oil treated.

One way of working according to my invention is illustrated as follows:—A crude distillate of Boryslav petroleum from which by the ordinary process of distillation only about 45% is available for making illuminating oil is separated by fractional distillation into the following fractions approximately:—3% by volume of a distillate of 0.757 specific gravity, 24% by volume 0.776 to 0.778 specific gravity, 73% of volume of 0.8255 specific gravity.

The first fraction is used in naphtha lamps and plumbers' torches.

The second fraction is treated as follows:—It is first introduced into a receptacle and nitric oxid gas NO, is introduced, for example by being passed in through glass tubes terminating near the bottom of the receptacle, until the gas is present in excess. The NO gas may be generated for example as follows:—For the deodorization of 100,000 kg. of the distillate, 72 kg. of sulfuric acid (of 1.84 specific gravity) is added to a substantially saturated aqueous solution of 30.5 kg. of sodium nitrate and 315 kg. of crystallized ferrous sulfate (which figures correspond to a small excess of the latter) and the mixture may be heated if necessary. The reaction which takes place is represented as follows:—

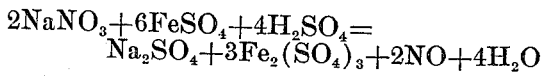

The NO thus prepared may be purified by passing it through two wash bottles the first of which contains a small amount of caustic soda solution, and the second of which contains water. It may then be absorbed in a cold concentrated aqueous solution of ferrous sulfate. On heating this solution a regular and controllable evolution of NO of high purity is obtained.

The treatment of the distillate with NO is continued until the latter is in slight excess which may be shown by withdrawing a small amount of the oil under treatment and agitating it with a strong solution of ferrous sulfate and if a brown coloration is produced, a sufficient excess is present. The temperature of the distillate during this treatment may be 15° C. although much higher temperatures even up to 100° C. may be employed if desired.

When a test shows that the nitric oxid treatment has been continued sufficiently long the distillate is allowed to stand for about 12 to 18 hours, depending upon temperature to insure the completion of the reaction and to allow impurities to settle. The so-treated distillate is then decanted and shaken up with a concentrated solution of ferrous sulfate which absorbs the excess of the NO, after which the two liquids are separated by settling and decantation and the distillate is then suitable for use, as a substitute for turpentine. The solution of ferrous sulfate separated from the distillate, and containing nitrogen compounds can be heated to again generate NO for treating an additional amount of distillate.

The treatment with NO, followed by the treatment with iron sulfate solution removes the color, and also removes certain impurities which impart a disagreeable odor to the distillate, but the exact nature of which is not definitely understood.

The third, or burning oil, fraction is preferably treated in a suitable manner to deodorize and decolorize the same.

The following is the preferred treatment of crude Burmah oil having a density of 0.815 at 15° C. and Abel flash point of 20° C.: A light spirit, for example, 20% of the whole, is first separated and purified by a suitable treatment. This can be used as naphtha. A further light spirit or turpentine substitute equal to for example, 10% of the whole is next separated and treated by the nitric oxid process as above described and gives a product having a density of 0.793 at 15° C. and an Abel flash point of 35° C. An illuminating fraction equal to for example, 32% of the whole is next separated and purified in a suitable manner to produce a product having a density of 0.833 at 15° C. and an Abel flash point of 68° C. suitable for use in lamps.

Although this invention is more particularly described with reference to a crude distillate of Boryslav petroleum and crude Burmah oil it will be understood that it is applicable to other petroleum oils and their distillates, with the results that fractions or ultimate products commercially valuable are obtained more especially as regards lighting oils and the substitutes for turpentine. It can be used where the characteristics of the products are suitable for use for other purposes than those mentioned herein.

The following are some further examples: A Galicia oil having a specific gravity at 15° C. of 0.828 and an Abel flash point of 22° C. gave 15% of heavy spirit having a specific gravity at 15° C. of 0.780 and an Abel flash point of 18° C. when treated by the nitric oxid process. A Galicia (wielopel) oil having a specific gravity at 15° C. of 0.8385 and an Abel flash point of 29° C. gave 10% of heavy spirit having a specific gravity at 15° C. of 0.785 and an Abel flash point of 21° C. when treated by the nitric oxid process. A Galicia (petrolea) oil having a specific gravity at 15° C. of 0.814 and an Abel flash point of 18° C. gave 20% of heavy spirit having a specific gravity at 15° C. of 0.775 and an Abel flash point of 18° C. when treated by the nitric oxid process. A Galicia (kabylanka) oil having a specific gravity at 15° C. of 0.835 and an Abel flash point of 26° C. gave 30% of heavy spirit having a specific gravity at 15° of 0.784 with an Abel flash point of 21° C. when treated by the nitric oxid process. A Roumania oil (schela tintea) having a specific gravity at 15° C. of 0.897 and an Abel flash point of 36° C. gave 12.5% of heavy distillate having a specific gravity at 15° C. of 0.736 and an Abel flash point of 21° C. when treated by the nitric oxid process. A Roumania oil (buzeu) having a specific gravity at 15° C. of 0.8085 and an Abel flash point of 28° C. gave 27% of heavy spirit having a specific gravity at 15° C. of 0.779 and an Abel flash point of 26° C., when treated by this process.

What I claim is:—

1. A process of producing illuminants which comprises separating petroleum and shale oils into fractions having different boiling points, and subjecting one of said fractions to the action of nitric oxid gas.

2. A process of treating oil distillates which comprises bringing into contact with said distillate, NO in excess under conditions to react therewith and thereafter treating said distillate with an agent capable of removing nitrogen compounds.

3. A process of treating oil distillates which comprises bringing into contact with said distillate NO under conditions to react therewith and thereafter treating said distillate with a ferrous compound.

4. A process of treating oil distillates which comprises bringing into contact with said distillate, NO under conditions to react therewith, and thereafter treating said distillate with a solution of ferrous sulfate.

5. A process of treating oil distillates which comprises passing bubbles of NO through the body of the distillate, until an excess of NO is in the oil, and thereafter treating said distillate with a ferrous compound to remove nitrogen compounds.

6. A process of treating an oil distillate having a density of about .776 to .778 for the production of a substitute for turpentine, which comprises treating the same with NO in excess, allowing to settle, removing the precipitated matter, treating the distillate with a ferrous compound to remove the excess of oxids of nitrogen, settling and separating the aqueous gravity between 0.770 layer.

7. The process of treating petroleum oils which comprises treating a distillate thereof having a specific gravity between 0.770 and 0.795 with NO in excess.

In testimony whereof I have affixed my signature in presence of two witnesses.

HERMAN WILLEM KNOTTENBELT.

Witnesses:
J. A. GODEFROI,
Dr. ED. HERZEN.